United States Patent [19]

Pereira et al.

[11] Patent Number: 4,510,263

[45] Date of Patent: Apr. 9, 1985

[54] CATALYST WITH HIGH GEOMETRIC SURFACE AREA ALUMINA EXTRUDATE AND CATALYST WITH HIGH GEOMETRIC SURFACE AREA

[75] Inventors: Carmo J. Pereira, Columbia; Louis Hegedus, Rockville, both of Md.

[73] Assignee: W. R. Grace & Co., New York, N.Y.

[21] Appl. No.: 542,363

[22] Filed: Oct. 17, 1983

[51] Int. Cl.³ .................. B01J 21/04; B01J 23/85; B01J 35/00

[52] U.S. Cl. .................. 502/314; 502/439; 502/527

[58] Field of Search .................. 502/314, 439, 527

[56] References Cited

U.S. PATENT DOCUMENTS

| | | | |
|---|---|---|---|
| 2,408,164 | 9/1946 | Foster | 252/259.2 |
| 3,907,710 | 9/1975 | Lundsager | 502/262 |
| 3,966,644 | 6/1976 | Gustafson | 252/455 R |
| 4,089,941 | 5/1978 | Villemin | 423/654 |
| 4,177,163 | 12/1979 | Oleck et al. | 502/439 X |
| 4,391,740 | 7/1983 | Gibson | 252/470 |
| 4,394,303 | 7/1983 | Gibson | 252/470 |

OTHER PUBLICATIONS

Knight Tower Packings published by Koch Engineering Company, Inc., Maurice A. Knight Division.

*Primary Examiner*—W. J. Shine
*Attorney, Agent, or Firm*—Edward J. Cabic

[57] ABSTRACT

An extrudate suitable for improved gas/liquid contacting is made from a solid, transitional alumina. The cylindrical extrudate has a partially hollow interior and internal reinforcing vanes or ribs extending from the inner wall to the center of the extrudate particle. This extrudate configuration permits the extrudate to have the large geometric surface area per reactor volume yet, because of the openings inside the extrudate, the particles do not exhibit a large pressure drop when packed in a deep bed. One or more Group VI and Group VIII metals can be impregnated to form a catalyst which provides superior desulfurization and demetallization activity than do similar size particles.

19 Claims, 3 Drawing Figures

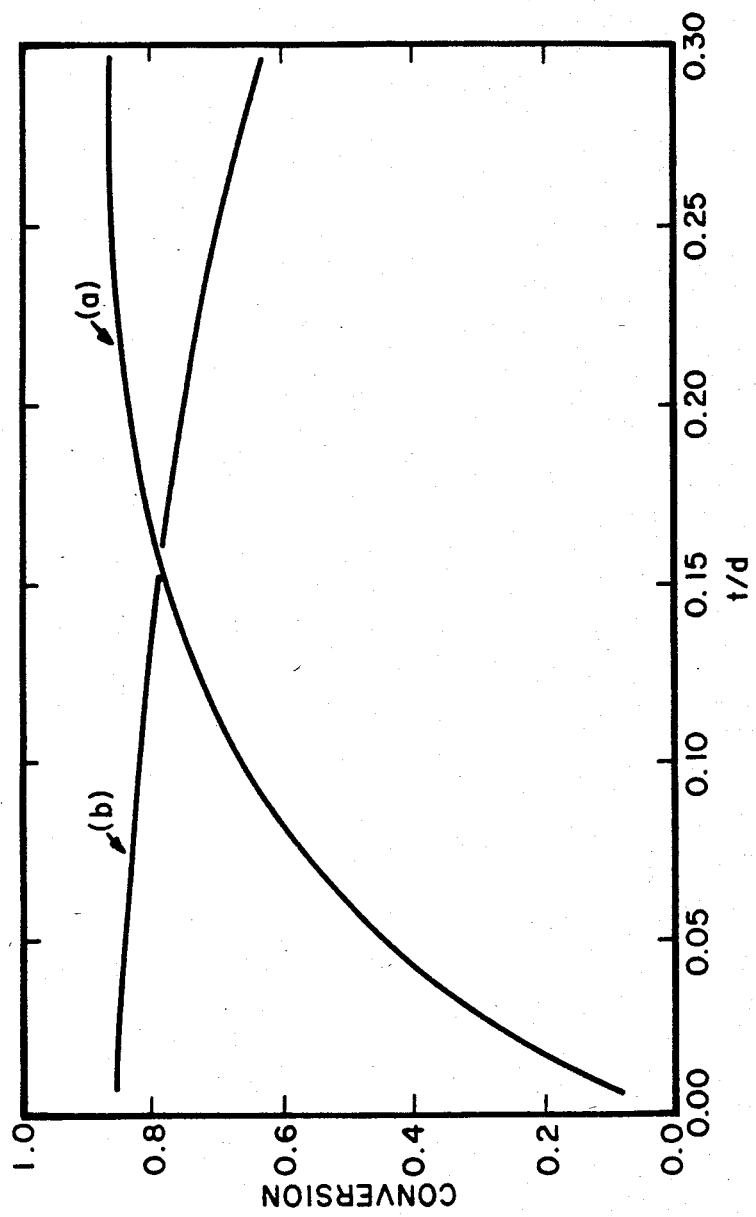

CATALYST WITH HIGH GEOMETRIC SURFACE AREA ALUMINA EXTRUDATE AND CATALYST WITH HIGH GEOMETRIC SURFACE AREA

CROSS-REFERENCE TO RELATED APPLICATIONS

U.S. Ser. No. 542,346, filed Oct. 17, 1983, discloses and claims the embodiment where the catalyst is used for auto emission control.

U.S. Ser. No. 542,440, filed Oct. 17, 1983 discloses and claims the doubly promoted catalyst embodiment utilizing ceria and alkali metal such as lithia.

BACKGROUND OF THE INVENTION

1. Field of the Invention

This invention relates to a shaped, porous extrudate suitable for use in contacting gases and liquids and as a catalyst support. The extrudate has a unique geometric shape which provides a large surface area and a large void fraction and may be impregnated with metals to undertake specific catalytic reactions.

2. Description of the Previously Published Art

To facilitate contacting gases and liquids various types of solid structures have been employed such as tower packings and catalyst particles with hydrotreating catalysts as an example. The tower packings have been made in many shapes such as Rashig rings, Berl saddles, Lessing rings and spiral rings. In general, these are relatively large structures having diameters or lengths on the order of one to several inches. Partition rings sold by The Maurice A. Knight Division of Koch Engineering Company, Inc., are hollow tubular elements with two internal intersecting cross vanes. These rings are made of porcelain or chemical stoneware by a technique which yields zero porosity materials. As a result the particles do not have a large BET nitrogen surface area. In addition, the partition rings are also of a large size with the commercial sizes ranging from 6 inch diameter by 6 inch height down to 3 inch by 3 inch.

Hydrotreating catalysts which are used to contact hydrocarbon liquids with gaseous hydrogen have been made in various shapes. In addition to the conventional spherical shape and the solid tubular extrudate, it has also been known to form extrudates with various external shape configurations. See U.S. Pat. No. 2,408,164 which has various types of shapes and American Cyanamid U.S. Pat. No. 3,966,644 which has a trilobal shape.

A problem with these prior art designs is that if they are made in a small size to increase the geometric surface area, they do not have a sufficiently large void fraction to permit the gas to easily flow through a bed of the particles without a large pressure drop.

3. Objects of the Invention

It is an object of this invention to produce an extrudate structure having a unique shape with a low density, high surface area and with a large void fraction.

It is a further object of this invention to obtain a catalyst support made out of a transitional alumina which permits metals to be directly deposited thereon to form the catalyst and which has a strong crush strength and a coherent geometric shape so that it does not easily break.

It is a further object of this invention to obtain an extrudate structure which is suitable for gas/liquid contacting.

It is also a further object of this invention to obtain a catalyst suitable for use as a hydrotreating catalyst.

These and further objects will become apparent as the description of the invention proceeds.

SUMMARY OF THE INVENTION

A transitional alumina extrudate is made which has a partially hollow interior. It can be used for two phase contacting or it can have a catalytically-effective amount of one or more Group VI metals or Group VIII metals such as iron, cobalt or metal deposited on the extrudate to form a hydrotreating catalyst. The extrudate is cylindrical with an annular configuration having internal reinforcing vanes or ribs extending from the inner wall to the center of the extrudate particle. The transitional alumina provides the catalyst with a large BET nitrogen surface area of at least 50 $m^2/g$ with even more preferable value of at least 100 $m^2/g$. The outside diameter can be up to about 6.5 mm for optimum results which is slightly larger than $\frac{1}{4}$ inch and the aspect ratio, which is the ratio of the length to the diameter, can vary from about 0.5 to 5 with especially preferred values of 0.5 to 2. The vanes or ribs inside the cylindrical portion of the extrudate provide at least 25% additional geometric surface area over what would be just the surface area of a hollow tube having the same inside and outside diameter. The pore volume of the catalyst is at least 0.3 $cm^3/g$ with a preferred embodiment having at least 0.5 $cm^3/g$. When the catalyst particles are packed into a reactor the geometric surface area of the catalyst obtained per reactor volume is at least 5 $cm^2/cm^3$ with a more preferred value being at least 20 $cm^2/cm^3$. In preferred embodiments the catalysts can be promoted with ceria.

This extrudate configuration permits the catalyst to have the large geometric surface area per reactor volume yet, because of the openings inside the extrudate, the catalyst particles do not exhibit a large pressure drop when packed in a deep bed. These catalysts provide superior desulfurization and demetallization activity than do similar size particles of the geometries tested by us.

BRIEF DESCRIPTION OF THE DRAWINGS

FIG. 3 illustrates design aspects for the extrudate in the presence of kinetic and externally diffusion controlled reactions.

DESCRIPTION OF THE PREFERRED EMBODIMENTS

The extrudate according to the present invention is fabricated in the form of a small tubular extruded member having a series of vanes which extend through the center of the axis of rotation of the tubular member. Viewed from the center, they appear as a series of ribs which extend out to the outer tubular element. In the embodiment shown in FIG. 1, there are 4 vanes or ribs and in the embodiment illustrated in FIG. 2 there are 6 vanes or ribs.

This unique geometry produces a structure having a large geometric surface area and a large void fraction. Because the support is made of a transitional alumina it is very porous. The effective surface area is vastly increased over what would be measured from the geometry alone. Moreover, it is also possible to directly impregnate the extrudate with catalytic metals which will adhere directly to the porous surface of the transitional alumina without the need for any washcoat.

Figure 1:
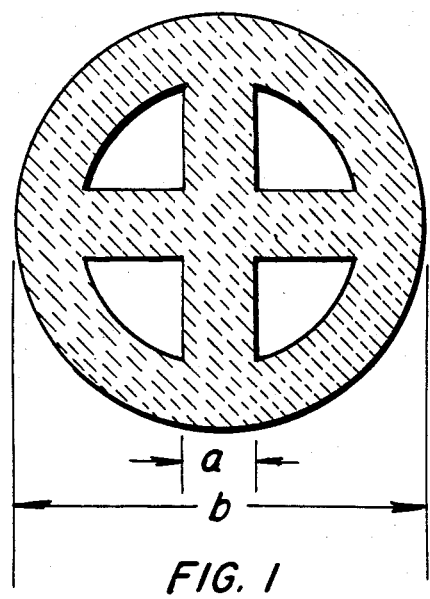
FIG. 1 illustrates a cross-section of one embodiment of the extrudate structure showing 4 vanes or ribs which support the tubular extruded body.

The ribbed extrudates with the hollow interior can be fabricated in various configurations. In FIG. 1 there are 4 internal reinforcing vanes or ribs. The overall diameter, b, can range in size up to about ¼ inch (6.35 mm) which can be rounded up in metric to about 6.5 mm. Smaller sizes can be used with a smaller size of about 1/16 inch (1.59 mm) being near the lower practical limit because it becomes difficult to fabricate hollow extrudates which are significantly smaller in size. A useful size extrudate with four vanes is the 1/10 inch (2.54 mm) size. The thickness of the vanes can also be varied. Generally, they are from about 0.10 to 0.30 of the diameter with especially preferred values being of from about 0.15 to 0.20 of the diameter.

Figure 2:
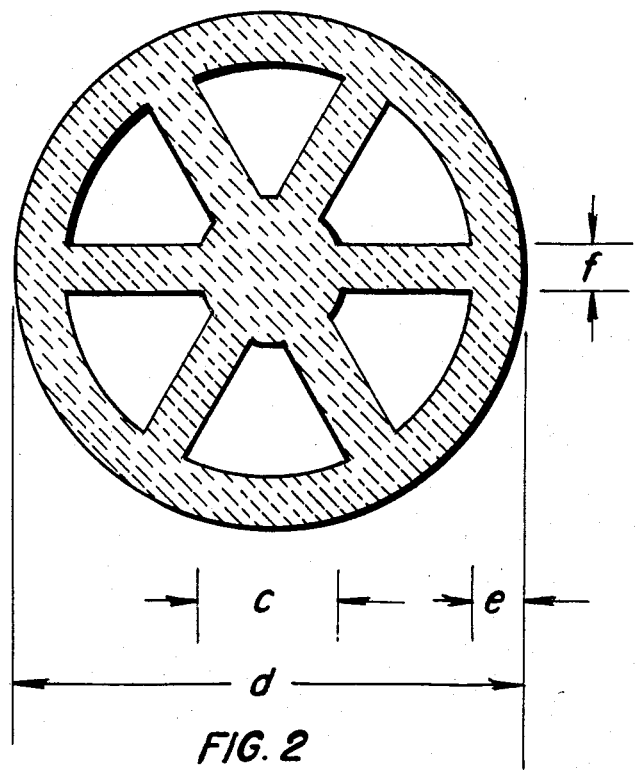
FIG. 2 illustrates a cross-section of another embodiment of the minilith structure showing 6 vanes or ribs which support the tubular extruded structure.

In another embodiment in FIG. 2, a 6-vaned extrudate is formed. Again, the overall diameter, d, can range in size up to about ¼ inch (6.35 mm) which can be rounded up in metric to about 6.5 mm. Smaller sizes can be used with a smaller size of about 1/10 inch (2.54 mm) being near the lower practical limit because it becomes difficult to fabricate hollow extrudates which are significantly smaller in size. A useful size extrudate with six vanes is the ⅛ inch (3.18 mm) size. Again, the thickness of the vanes can also be varied. Generally, they are from about 0.10 to 0.30 of the diameter with especially preferred values of from about 0.07 to 0.15 of the diameter. In the embodiment illustrated in FIG. 2, the die has been configured so that where the vanes come together they form a circular hub which has a diameter, c, which can be adjusted in size. The hub is an optional structural feature to provide additional crush strength for the extrudate. It can be used with either the 4 or the 6-vaned embodiments.

The thickness of the wall of the extrudate, shown as e in FIG. 2, can also be varied. The thicker the wall, the stronger will be the extrudate in terms of crush strength. Generally, it is preferred to have a wall thickness which is about 0.10 to about 0.30 of the diameter of the extrudate based on calculations to be made infra for the optimum design of the extrudate when subjected to parallel reactions which are controlled by external mass transfer and by kinetics. It is our experience that an even more preferred ratio is from about 0.15 to about 0.20.

The aspect ratio is the ratio of the length of the particle to its diameter. Aspect ratios can vary from 0.5 to 5 with generally preferred aspect ratios of 0.5 to 2.

The optimum design of the extrudate according to the present invention in terms of the ratio of the cylindrical wall thickness to the extrudate diameter where the wall and the vane have the same thickness can be made for reacting systems containing independent parallel reactions that are controlled by external mass transfer or by reaction kinetics.

For extrusions whose external dimensions are given by a diameter, d, and length, L, and a fixed density, the reactant concentration, c, for an isothermal first-order reaction in a plug-flow tubular reactor is given by $$\frac{dc}{dx} = -\frac{\bar{k}c}{SV} \tag{1}$$

where
$\bar{k}$ is the rate constant, 1/sec
SV is the space velocity, $cm^3/cm^3$-sec
x is the fractional position in the bed
c is concentration of reactant, $mole/cm^3$ In the case of an impregnated 4-ribbed extrudate under reaction control, the effectiveness factor defined as the ratio of the actual reaction rate to the rate in the absence of diffusional resistances is unity and $$\bar{k} = k_r(1 - \epsilon_{int})(1 - \epsilon_o) \tag{2}$$

where,
$\epsilon_o$ is the void fraction in between extrudates
$k_r$ is the rate constant defined on a catalyst volume basis and is constant when the $cm^2$ of metals per volume of catalyst is invariant.
$\epsilon_{int}$ is the void fraction within the extrusion and is approximated using geometric considerations by $$\epsilon_{int} = \left[ (1 - 2x)^2 - \frac{4x}{\pi}(2 - 5x) \right] \tag{3}$$

where,
x = t/d
t = thickness of the vane

As given in equations (1)–(3), for kinetically controlled reactions increasing internal voidage reduces the volume of catalyst in the reactor and decreases reactant conversion given by $$\chi = 1 - \exp\left[ -\frac{\bar{k}}{SV} \right] \tag{4}$$

This situation is depicted schematically in FIG. 3, curve (a).

For external transport limited reactions, or when the dominant resistance is interparticle mass transfer limited, the reactor concentration profile is given by equation (1) with $$\bar{k} = k_m a_r \tag{5}$$

where,
$k_m$ = mass transfer coefficient, cm/sec
$a_r$ = geometric surface area per reactor volume, $cm^2/cm^3$ and $$a_r = (1 - \epsilon_o)(1 - \epsilon_{int})(S_x/V_a) \tag{6}$$

$S_x/V_a$ = geometric surface area per volume of alumina
$a_r$ can be approximated using geometric considerations as, $$\frac{(1 - \epsilon_o)}{d}\left[ 4 + \frac{16}{\pi}\left\{ \frac{\pi}{4}(1 - 2x) + (1 - 4x) \right\} + \frac{2d}{L}(1 - \epsilon_{int}) \right] \tag{7}$$

From equations (1), (3), (4)–(7), for external transport limited reactions, in extrudates of the same external geometry, increasing internal extrudate voidage (by decreasing wall thickness) results in an increase in external surface area per reactor volume, $a_r$, and conversion increases. This is shown as curve (b) in FIG. 3.

Thus optimal extrudate shape and wall thickness can be prescribed depending on whether the primary reaction is kinetically on interphase diffusion controlled. In petroleum processing the desulfurization reaction is often kinetic reaction controlled while the demetallization reaction is often transport controlled. Thus, for reactors with both types of reactions occurring, an optimal extrudate wall thickness can be chosen such that conversion of both types of reactions is maximized. Optimal t/d ratios of from 0.10 to 0.30 are advantageous with especially preferred values of 0.15 to 0.20 as shown in FIG. 3.

The extrudate support can be characterized in terms of pore structure, pore radius and pore volume by the mercury penetration technique using pressures up to and over 60,000 psig which is well known in the art as mercury porosimetry. A Micromeritics Auto-Pore 9200 porosimeter is used with the results plotted to show the cumulative volume of mercury penetration per gram of sample on the vertical axis and the porosimeter pressure on the horizontal axis on a logarithmic scale. The present extrudate support is bimodal with two types of pores which are the micropores and the macropores. The porosimeter curve for the bimodal support shows two steps. The inflection point between the ends of the first step starting from the origin of the curve represents the breakpoint between the macropores and the micropores in the support, the portion of the curve to the left of the inflection point representing the macropore structure and that to the right representing the micropore structure. The pore radius for the two types of pores can be directly calculated from the pressure applied in the test for any given pressure. The cumulative macro and micropore volumes in cc/g. may be read directly from the curve. The pore radius and volume information is then used to calculate the integral average values for the pore radii. The integral averaging for the macropores proceeds from 0 to the macropore volume as discussed above while that for the micropores proceeds from the macropore volume to the total volume. The details of the test and of curve analysis and calculations are fully set forth in, among others, "Chemical Engineering Kinetics" by J. M. Smith, McGraw-Hill Publishing Company, New York, Second Edition, 1970.

A significant advantage of these ribbed extrudates over conventional spheres is their ability to provide both a large geometric surface area per packed volume of reactor and to provide a lower pressure drop across the bed than is obtained by spheres having a comparable geometric surface area per packed volume. To determine pressure drops 50 cm³ samples of the 4-vaned extrudate according to the present invention and three different sizes of spheres were each placed in a glass tube (ID=2.16 cm) having a glass frit at the bottom. The tube diameter was over 7 times the diameter of the largest particle tested, thus minimizing wall effects. Catalyst pellets were screened to remove fines. The support was periodically unloaded and the empty tube pressure-drop measured to ensure that there was no frit plugging. Bed pressure drops were measured using a U-tube manometer. From the calibration curves for the empty tube and the pressure drop in a tube packed with catalyst, the pressure drop across the support alone was obtained by difference.

The variation of bed-pressure drop (in cm of $H_2O$/cm bed) is shown as a function of the superficial velocity of air at 25° C. and 1 atm in Table 1.

TABLE 1

| | Catalyst Bed Pressure Drop | | | |
|---|---|---|---|---|
| Superficial velocity, (cm/sec) | 3/32 inch 4-vaned extrudate | 1/10 inch spheres | 1/16 inch spheres | 1/32 inch spheres |
| 5.1 | .02 | .04 | .12 | .18 |
| 13.4 | .06 | .08 | .21 | .51 |
| 21.9 | .10 | .16 | .34 | .83 |
| 29.3 | .15 | .24 | .45 | 1.17 |
| 37.5 | .18 | .31 | .61 | 1.58 |
| 45.2 | .25 | .40 | .80 | 2.03 |
| 53.2 | .32 | .51 | 1.00 | 2.51 |
| 60.7 | .40 | .61 | 1.19 | 3.07 |
| 133.0 | .94 | 1.58 | 4.06 | 9.11 |

The data in Table 1 clearly show that for each superficial velocity there is a lower pressure drop for the extrudate than for any of the spheres of the same nominal size or smaller.

The optimal pressure drop comparison should be made for a sphere having the same geometric surface area per packed volume. To determine the diameter of such a sphere the surface area per reactor volume of the extrudate is first calculated as follows. For L=0.3424 cm and d=0.2680 cm the volume of the cylinder extrusion is given by $$(\pi d^2 L/4)$$

The number of 4-vaned extrudates per cm³ of packed volume is measured as 39.1. From this $\epsilon_o$, the void fraction between extrudates, is calculated to be 0.245. For the 4-vaned extrusion, x=t/d=0.151 and $a_r$ is calculated using equation (7) to be 28.13 cm$^{-1}$. In the calculation of equivalent sphere size we use $a_{r,sphere}=(1-\epsilon_o)6/d_{sphere}$ Since packed beds containing spheres have $\epsilon_o=0.38$, the equivalent sphere diameter is calculated as 1/20 (1.32 mm).

Thus the sphere to be compared to the extrudate is one having a diameter of 1/20 inch (1.32 mm). Although there is not one of this size in Table 1, the pressure drop value for such a sphere would be between the values of the 1/16 inch and the 1/32 inch sphere. Just comparing the extrudate with the 1/16 inch spheres shows a factor of 3-7 times less pressure drop for the extrudates according to the present invention.

In Table 2 below, the pressure drop values for 1/20 inch spheres have been obtained from Table 1 data by interpolation between 1/16 inch and 1/32 inch spheres.

TABLE 2

| | Catalyst Bed Pressure Drop | |
|---|---|---|
| Superficial velocity, (cm/sec) | 3/32 inch 4-vaned extrudate | 1/20 inch spheres |
| 5.1 | .02 | .14 |
| 13.4 | .06 | .32 |
| 21.9 | .10 | .49 |
| 29.3 | .15 | .68 |
| 37.5 | .18 | .90 |
| 45.2 | .25 | 1.2 |
| 53.2 | .32 | 1.5 |
| 60.7 | .40 | 1.70 |
| 133.0 | .94 | 5.8 |

The pressure drop for the extrudate according to the present invention is 4-7 times less than the corresponding extrapolated pressure drops for sphere with 1/20 inch diameter.

Having described the basic aspects of our invention, the following examples are given to illustrate specific embodiments thereof.

EXAMPLE 1

The extrudate support was made as follows. Into a bench mix muller was added 490 g of pseudo boehmite made according to the procedure in the M. G. Sanchez and N. R. Laine U.S. Pat. No. 4,154,812 which was dried at about 135° C. to a TV of 29.23%, 10 g of Methocel (made by Dow Chemical Co.), and about 200 ml of deionized water. The mixture was mulled for 10 minutes, followed by the addition of another 200 ml of water and further mulling for a total of 45 minutes. The mixture was extruded through a ⅛ inch inside diameter die with four inserts at a pressure of about 2500-3000 psi. The extrudates having the cross section shown in FIG. 1 were oven dried at 116° C. overnight. These dried extrudates were used to make catalysts in the following examples.

To further characterize the extrudates, a portion was calcined at 538° C. for 3 hours. The average diameter was 0.1105 inch (2.81 mm) and the average length was 0.1386 inch (3.52 mm), giving an aspect ratio of 1.25. The density was 0.442 g/cc.

EXAMPLE 2

This example provides a comparison between a 4-vaned extrudate catalyst according to the present invention and a solid extrudate catalyst having the same diameter and aspect ratio.

A 4-vaned extrudate was made following the procedure of Example 1. A similar solid extrudate was made having the same diameter and aspect ratio and made from the same starting material. The two extrudates were made into catalysts by impregnating them with cobalt and molybdenum salts and heating to 1350° F. (732° C.) for 2 hours which reduced the diameter to 0.0938 inch (2.38 mm) and made the aspect ratio 1.5. The amount of metals (Co-Mo) per unit volume of alumina was held constant for the two materials, resulting in similar intrinsic rate constants on a unit volume of alumina basis. The final catalysts are characterized in Table 3.

TABLE 3

Comparison of 4-Vaned Extrudate with Solid Extrudate Having the same Diameter and Aspect Ratio

|  | 4-Vaned Extrudate | Solid Extrudate |
|---|---|---|
| $V_{total}$, cm³/g | 0.6063 | 0.6870 |
| $V_{macro}/V_{total}$ | 0.066 | 0.030 |
| $r_{macro}$, avg., AU | — | 463 |
| $r_{micro}$, avg., AU | 51 | 51 |
| Pellet density[1] | 1.071 | 1.0166 |
| Surface area (Hg), m²/g | 229 | 228 |
| Wt. pct., CoO[2] | 3.60 | 3.60 |
| Wt. pct., MoO₃[2] | 16.1 | 16.1 |
| Surface area (Hg), m²/g Al₂O₃ | 285 | 283 |
| μ moles Mo/m²Al₂O₃ | 4.9 | 4.9 |
| Bed void fraction | 0.52 | 0.4 |
| Geometric surface area/ reactor volume, cm⁻¹ | 22.4 | 13.4 |

AU = Angstrom Unit
[1] g per cm³ of alumina
[2] Calculated

Each of the catalysts were evaluated for five days in an around the clock operation using an Ashland Heavy Oil feed. The catalyst was sulfided for 10 hours. Then the reactor was lined out for at least 35 hours at 650° F. (343° C.) and a LHSV of 2. A product sample was taken at these conditions and the space velocity reduced to 1. After equilibration for at least 3 hours another sample was taken. The temperature was increased to 750° F. (399° C.) and the LHSV to 2 and the reactor allowed to run at these conditions overnight. The next morning a product sample was taken at 750° F. and LHSV of 2. Then the space velocity was reduced to 1 and after at least 3 hours another product sample was taken. The temperature was reduced to 650° F. and the space velocity increased to 2. The reactor was allowed to operate overnight and the next morning product samples were collected at these conditions. No substantial activity loss occurred over the period of the test.

The activity results are set forth in Table 4.

TABLE 4

|  | LHSV | | | | | |
|---|---|---|---|---|---|---|
|  | 1.0 | | | 2.0 | | |
| Poisons | S | Ni | V | S | Ni | V |
| % Reduction of | | | T = 399° F. | | | |
| Poisons in the effluent | | | | | | |
| Extrudate | 60 | 34 | 50 | 55 | 30 | 40 |
| 4-vaned solid | 48 | 16 | 32 | 41 | 13 | 25 |
|  | | | T = 343° F. | | | |
| Extrudate | 33 | 19 | 30 | 25 | 12 | 19 |
| 4-vaned solid | 29 | 9 | 15 | 22 | 3 | 9 |

For desulfurization at 399° C. there is at least some partial limitation by diffusion within the particle because the differences in percent desulfurization are greater than at 343° C. at which the two geometries are kinetically controlled. The devanadation and denickelation are strongly diffusion controlled. Thus, the 4-vaned extrudate has substantially higher demetallization activity than that of the solid extrudate at both 343° and 399° F.

EXAMPLE 3

This example compares the 4-vaned extrudate catalyst according to the present invention with two other solid extrudate catalysts.

The 4-vaned extrudate as prepared in Example 2 was compared with two different solid extrudate catalysts which are identified as Catalyst A and Catalyst B. The diameter and aspect ratios are given in Table 5 along with the similar metals loadings.

TABLE 5

|  | outer | aspect | Metals Loading (wt. %) | |
|---|---|---|---|---|
| Description | diameter $d_p$(mm) | ratio L/D | Cobalt CoO | Molybdenum MoO₃ |
| 4-vaned extrudate | 2.68 | 1.5 | 3.6 | 16.1 |
| Catalyst A | 1.67 | 3-4 | 3.1 | 13.2 |
| Catalyst B | 1.41 | 3-4 | 3.6 | 16.1 |

The three catalysts were evaluated fresh using the same test procedure described in Example 2. The activity results are given in Table 6.

TABLE 6

| Poisons | LHSV 1.0 | | | 2.0 | | |
|---|---|---|---|---|---|---|
| | S | V | Ni | S | V | Ni |
| % Reduction of Poisons in the effluent | | | | | | |
| T = 399° F. | | | | | | |
| 4-vaned extrudate | 60 | 50 | 34 | 55 | 40 | 30 |
| Catalyst A | 44 | 35 | 25 | 38 | 23 | 22 |
| Catalyst B | 60 | 49 | 25 | 52 | 36 | 20 |
| T = 343° F. | | | | | | |
| 4-Vaned extrudate | 33 | 30 | 19 | 25 | 19 | 12 |
| Catalyst A | 26 | 20 | 11 | 19 | 15 | 7 |
| Catalyst B | 33 | 25 | 23 | 30 | 9 | 5 |

The 4-vaned catalyst is seen to be clearly superior to the Catalyst A for all of the activity. It is also equivalent to or superior to Catalyst B. Even though the Catalysts A and B are smaller in diameter, the 4-vaned extrudate is still comparable or superior.

EXAMPLE 4

This example illustrates the performance under severe operating conditions of the 4-vaned extrudate according to the present invention and a commercially available extrudate catalyst.

The 4-vaned extrudate and Catalyst A of Example 3 were tested under severe operating conditions so that the metals/coke deposition was maximized. An Ashland atmospheric resid was used at on operating temperature of 750° F. (399° C.) and LHSV of 5 compared to a normal LHSV value of 1 or less used commercially. This insured high reaction rates and increased catalyst exposure to metals. The hydrogen flow was decreased to 1000 SCF/BBL as compared to the standard of 4000 SCF/BBL to accelerate coking. The results for various times on stream are set forth in Table 7.

TABLE 7

| Time on Stream hours | 4-Vaned Extrudate | | | Catalyst A | | |
|---|---|---|---|---|---|---|
| | S | Ni | V | S | Ni | V |
| 40 | 31 | 19 | 19 | 21 | 10 | 10 |
| 60 | 27 | 18 | 18 | 20 | 13 | 9 |
| 80 | 26 | 17 | 17 | 19 | 13 | 9 |
| 100 | 25 | 17 | 17 | 19 | 13 | 9 |

After 100 hours on stream the 4-vaned extrudate conversion exceeded that of the Catalyst A by 6% for desulfurization, 8% for vanadium removal and 4% for nickel removal.

It is understood that the foregoing detailed description is given merely by way of illustration and that many variations may be made therein without departing from the spirit of this invention.

What is claimed is:

1. A transitional alumina extrudate having a cylindrical hollow annular configuration with internal reinforcing vanes, a nitrogen surface area of at least 50 m$^2$/g; a diameter of up to about 6.5 mm; and aspect ratio of the length to the diameter of from about 0.5 to 5; a geometric surface area of at least 25% greater than a hollow tube of the same inside and outside diameter; a porosity of at least 0.3 cm$^3$/g; and a surface area per reactor volume of at least 5 cm$^2$/cm$^3$.

2. An extrudate according to claim 1, wherein the number of internal reinforcing vanes meeting in the center is 4.

3. An extrudate according to claim 1, wherein the number of internal reinforcing vanes meeting in the center is 6.

4. An extrudate according to claim 1, wherein the surface area is at least 100 m$^2$/g.

5. An extrudate according to claim 1, wherein the surface area per reactor volume is at least 20 cm$^2$/cm$^3$.

6. An extrudate according to claim 1, wherein the porosity is at least 0.5 cm$^3$/g.

7. An extrudate according to claim 1, wherein the aspect ratio is from about 0.5 to 2.

8. An extrudate according to claim 1, wherein the ratio of the wall thickness of the cylinder to the diameter is from about 0.1 to 0.3.

9. An extrudate according to claim 8, wherein the ratio of the wall thickness of the cylinder to the diameter is from about 0.15 to 0.20.

10. A catalyst suitable for hydrotreating comprising a solid, transitional alumina extrudate support structure having a cylindrical hollow annular configuration with internal reinforcing vanes, a nitrogen surface area of at least 50 m$^2$/g; a diameter of up to about 6.5 mm; an aspect ratio of the length to the diameter of from about 0.5 to 5; a geometric surface area of at least 25% greater than a hollow tube of the same inside and outside diameter; a porosity of at least 0.3 cm$^3$/g; a surface area per reactor volume of at least 5 cm$^2$/cm$^3$ and a catalytically-effective amount of one or more Group VI metals or Group VIII metals selected from the group consisting of iron, cobalt and nickel deposited on the support structure.

11. A catalyst according to claim 10, wherein the number of internal reinforcing vanes meeting in the center is 4.

12. A catalyst according to claim 10, wherein the number of internal reinforcing vanes meeting in the center is 6.

13. A catalyst according to claim 10, wherein the surface area is at least 100 m$^2$/g.

14. A catalyst according to claim 10, wherein the surface area per reactor volume is at least 20 cm$^2$/cm$^3$.

15. A catalyst according to claim 10, wherein the porosity is at least 0.5 cm$^3$/g.

16. A catalyst according to claim 10, wherein the aspect ratio is from about 0.5 to 2.

17. A catalyst according to claim 10, wherein the ratio of the wall thickness of the cylinder to the diameter is from about 0.1 to 0.3.

18. A catalyst according to claim 17, wherein the ratio of the wall thickness of the cylinder to the diameter is from about 0.15 to 0.20.

19. A catalyst according to claim 10, wherein the metals deposited are cobalt and molybdenum.

* * * * *

UNITED STATES PATENT AND TRADEMARK OFFICE
CERTIFICATE OF CORRECTION

PATENT NO. : 4,510,263
DATED : April 9, 1985
INVENTOR(S) : Carmo J. Pereira and Louis Hegedus It is certified that error appears in the above-indentified patent and that said Letters Patent is hereby corrected as shown below:

ON THE TITLE PAGE, ITEM [54] AND IN COLUMN 1

Change the title to read:

"ALUMINA EXTRUDATE AND CATALYST WITH HIGH GEOMETRIC SURFACE AREA".

Column 5, line 6, change "on" to --or--.

Column 8, replace TABLE 4 as shown on attached sheet.

Signed and Sealed this

Twenty-ninth Day of June, 1993

Attest:

MICHAEL K. KIRK

Attesting Officer     Acting Commissioner of Patents and Trademarks

UNITED STATES PATENT AND TRADEMARK OFFICE
CERTIFICATE OF CORRECTION

PATENT NO. : 4,510,263
DATED : April 9, 1985
INVENTOR(S) : Carmo J. Pereira and Louis Hegedus It is certified that error appears in the above-indentified patent and that said Letters Patent is hereby corrected as shown below:

TABLE 4

LHSV

| Poisons | 1.0 | | | 2.0 | | |
|---|---|---|---|---|---|---|
| | S | Ni | V | S | Ni | V |

T = 399°F

% Reduction of Poisons in the effluent

| | | | | | | |
|---|---|---|---|---|---|---|
| Extrudate | | | | | | |
| 4-vaned | 60 | 34 | 50 | 55 | 30 | 40 |
| solid | 48 | 16 | 32 | 41 | 13 | 25 |

T = 343°F

| | | | | | | |
|---|---|---|---|---|---|---|
| Extrudate | | | | | | |
| 4-vaned | 33 | 19 | 30 | 25 | 12 | 19 |
| solid | 29 | 9 | 15 | 22 | 3 | 9 |